United States Patent [19]

Stoick

[11] 3,860,078
[45] Jan. 14, 1975

[54] SNOWMOBILE SUPPORT DOLLY

[76] Inventor: John J. Stoick, 23045 Kirk Rd., Vassar, Mich. 48768

[22] Filed: May 31, 1972

[21] Appl. No.: 263,396

[52] U.S. Cl................. 180/5 R, 254/8 R, 280/79.1
[51] Int. Cl............................................ B62b 1/06
[58] Field of Search.................... 280/79.1; 248/352; 180/5 R; 254/8 R, 8 A, 131

[56] References Cited
UNITED STATES PATENTS

| | | | |
|---|---|---|---|
| 1,014,992 | 1/1912 | Ames | 254/8 B |
| 2,830,824 | 4/1958 | Young | 280/79.1 |
| 3,570,616 | 3/1971 | Tominaga | 180/5 R |
| 3,647,237 | 3/1972 | Milton | 254/8 R |
| 3,667,728 | 6/1972 | Garelick | 254/8 R |

Primary Examiner—Robert R. Song
Attorney, Agent, or Firm—John J. Swartz

[57] ABSTRACT

Snowmobile support apparatus comprising a support dolly for lifting and supporting the rear end of a snowmobile and including a support frame engageable with a portion of the rear end of the snowmobile and swingably movable between an inoperative position and a support position underlying the snowmobile portion for lifting the rear end of the snowmobile as the support frame is forwardly moved to the snowmobile supporting position, and roller wheels supporting the frame for rolling movement to and from the snowmobile supporting position, the roller wheels being positioned both rearwardly and forwardly of the center of gravity of the dolly when the rear end of the snowmobile is supported thereon.

6 Claims, 5 Drawing Figures

PATENTED JAN 14 1975 3,860,078
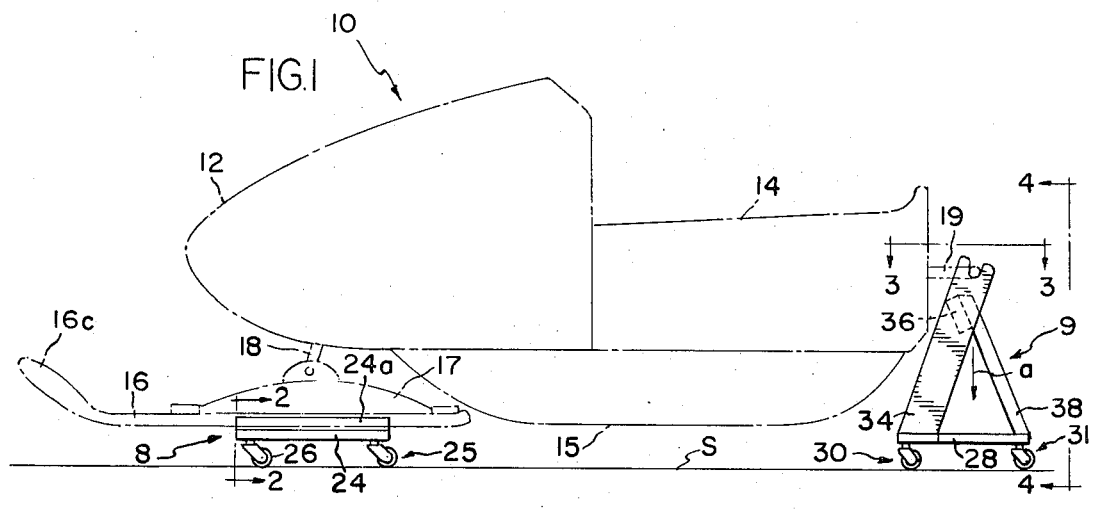
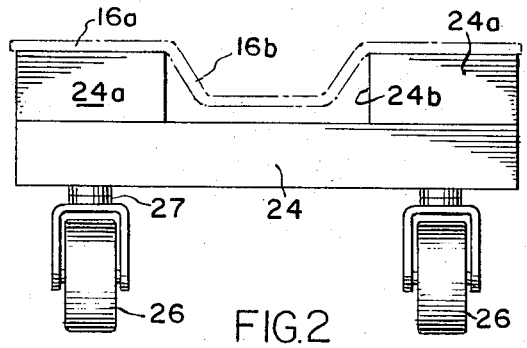
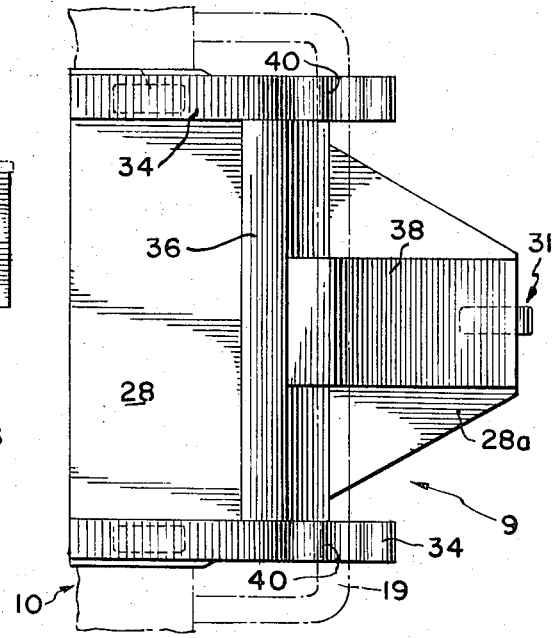
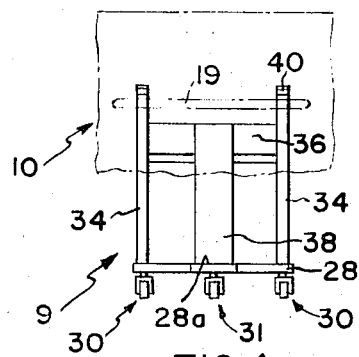
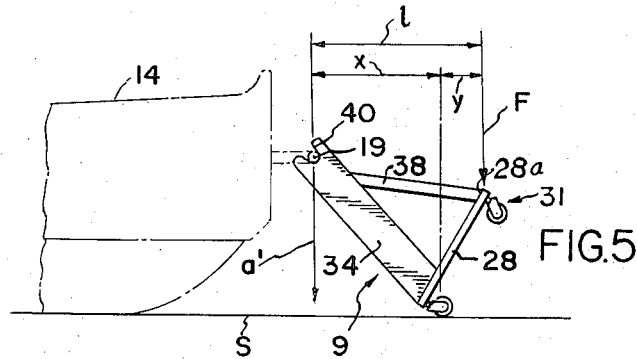

SNOWMOBILE SUPPORT DOLLY

FIELD OF THE INVENTION

This invention relates to support dollies and more particularly to a dolly for lifting and supporting the rear end of a snowmobile.

BACKGROUND OF THE INVENTION

Snowmobiles are frequently stored in automobile garages and must be periodically moved to permit cleaning therearound. The task of manually moving a snowmobile across a garage floor is very difficult because the snowmobile is heavy and cumbersome. Accordingly, it is an object of the present invention to provide apparatus which will enable a snowmobile to be easily lifted and moved across a floor.

It is another object of the present invention to provide dolly apparatus for supporting a snowmobile for rolling movement across a floor.

It is yet another object of the present invention to provide a movable snowmobile support dolly which will enable the user to lift the rear end of a snowmobile with mechanical advantage as the dolly is being moved to a support position.

Snowmobiles are driven by endless ground engaging drive tracks which are adversely affected if the snowmobiles are stored with the snowmobiles resting on the tracks for extended periods of time. Accordingly, it is still another object of the present invention to provide a snowmobile support dolly which will support the rear of the snowmobile so that the endless drive track is suspended above the support surface.

To conserve storage space, it is important that the snowmobile support apparatus not project a substantial distance beyond the longitudinal or vertical confines of the snowmobile. Accordingly, yet another object of the present invention to provide compact snowmobile support apparatus.

Other objects and advantages of the present invention will become apparent as the description hereof proceeds.

SUMMARY OF THE INVENTION

Dolly apparatus for a snowmobile having a pair of laterally spaced apart longitudinal steering skis at its forward end comprising: carriage means reactable between the rear of the snowmobile and a supporting surface for lifting the rear end of the snowmobile off the surface and movably supporting it a spaced distance above the surface when the snowmobile and carriage means are longitudinally moved toward each other and the carriage means is moved to a snowmobile supporting position; the carriage means including frame means having a first frame portion engageable with the rear of the snowmobile and another portion swingable in a forward path of travel when the frame means and snowmobile are moved toward each other, between a removed position and a snowmobile support position underlying the first frame portion; and rolling means supporting the frame means for movement in the swinging path of travel to the support position and for rolling movement in the support position in any direction on the surface to be traversed; the rolling means including wheels engageable with the surface both forwardly and rearwardly of a vertical plane extending through the center of gravity of the frame means when the snowmobile is supported thereon.

The present invention may more readily be understood by reference to the accompanying drawing in which:

FIG. 1 is a side elevational view illustrating apparatus constructed according to the present invention supporting a snowmobile;

FIG. 2 is an enlarged sectional front view taken along the line 2—2 of FIG. 1 and illustrating one of the front support dollies;

FIG. 3 is a top plan view of the rear support dolly constructed according to the present invention and taken along the line 3—3 of FIG. 1;

FIG. 4 is a rear elevational view of the rear dolly supporting apparatus taken along the line 4—4 of FIG. 1; and FIG. 5 is a fragmentary side elevational view, similar to FIG. 1, illustrating the rear support dolly in an initial position prior to lifting the snowmobile.

BRIEF DESCRIPTION OF THE PREFERRED EMBODIMENT

Apparatus constructed according to the present invention comprises a front pair of ski supporting dollies 8 and a rear support dolly or carriage, generally designated 9, particularly adapted for use in supporting a snowmobile, generally designated 10, including a hull 12, a seat 14 and an endless ground engageable drive track 15 at its rearward end. The front of the snowmobile includes a pair of laterally spaced apart king pins 18 supported on a pair of longitudinally extending skis, generally designated 16, by leaf spring assemblies 17, as usual. The skis 16 each include a longitudinal runner 16a having a depressed, longitudinal, steering rib 16b and an upturned front end 16c. A generally U-shaped, rearwardly extending support rod 19 fixed to the rear end of the snowmobile provides a grip by which the rear of the machine may be lifted.

The front ski supporting dollies 8 each comprise a horizontal base support platform 24, supported for rolling movement in any direction on a support surface S by two underlying caster assemblies 25 including ground engageable wheels 26 rotatably supported by axles or support pins 27. The front dollies 8 each include a pair of side rails 24a on the platform 24 for supporting the longitudinal ski runner 16a and defining a trough 24b receiving the longitudinal steering rib 16b therebetween. The skis 16 may be individually placed on the dollies 8 by sequentially lifting the front upturned ends 16c of the skis 16 and sliding the dollies 8 thereunder.

The rear dolly 9 comprises a base support platform 28 supported for rolling movement in any direction on the surface S to be traversed by a pair of front caster assemblies 30, and a single rear caster assembly 31, constructed identically to the caster assemblies 25. The rear dolly 9 includes a pair of upstanding, rearwardly inclined side frame members 34 spanned by a crossbrace member 36 fixed to an upstanding, oppositely inclined, rear brace member 38 supported on the rear portion 28a of the platform 28. The upper ends of the front brace members 34 are notched at 40 to receive the support rod 19 at the rear of the snowmobile for lifting the rear end of the snowmobile 10 off the surface S when the dolly 9 is swung from the inoperative position, illustrated in FIG. 5, to the snowmobile support position, illustrated in FIG. 1, underlying the support rod 19.

THE OPERATION

The front ends 16c of the snowmobile skis 16 are sequentially lifted and the front dollies 8 are sequentially slid thereunder with the ribs 16b of the skis 16 being received in the troughs 24b defined by the front dolly side rails 24a. The rear dolly 9 is then moved to the position illustrated in FIG. 5, with the notches 40 at the top of the side frame members 34 receiving the transverse portion of the rod 19 at the back of the snowmobile 10. When the rear dolly 9 is in the position illustrated in FIG. 5, the center of gravity lies in a vertical plane represented by the arrow $a'$ forward of the front pair of dolly casters 30. The operator then merely steps, or otherwise exerts a vertical force F, on the rear end 28a of the dolly platform 28 to force the platform 28 forwardly on the front casters 30 and swing the rear dolly frame members 34, 36 and 38 around the support rod 19 until the dolly platform 28 moves to the snowmobile support position, illustrated in FIG. 1, underlying the rod supporting notch portions 40. As the rear dolly 9 is swung to the position illustrated in FIG. 1, the center of gravity shifts rearwardly relative to the rollers 30 and 31 so that the vertical plane $a'$ extending through the center of gravity is located between the front and rear caster rollers 30 and 31, as illustrated by the arrow $a$ (FIG. 1).

The dolly 9 functions as a variable length lever having a length 1 pivoted about a fulcrum comprising the front caster wheels 30. As the dolly 9 is moved forwardly and the snowmobile is lifted, the mechanical advantage of the lever or dolly 9 is increased to minimize the force otherwise required to raise the rear end of the snowmobile. The distance $x$ between the fulcrum and the pivot supports 40 will decrease as the distance $y$ between the force applying end 28a of the platform 28 and the front casters 30 increases. When the front casters 30 move to a position forward of the support notches 40 and the center of gravity is shifted rearwardly such that a vertical plane, indicated by the arrow $a$ and extending through the center of gravity, is between the casters 30 and 31, the weight of the snowmobile will supplement the force F in moving the rear dolly 9 the final incremental, swinging distance to the position illustrated in FIG. 1. With the center of gravity being in a vertical plane between the front and rear caster assemblies, there is no concern for the snowmobile slipping off the rear dolly and injuring a bystander. With the snowmobile dolly in the position illustrated in FIG. 1, the snowmobile may then be easily moved across the garage floor S without a substantial amount of effort. Because of the compactness of the dollies, the machine may be moved close to a wall.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

What is claimed is:

1. Dolly apparatus in combination with a snowmobile having a support portion rigidly connected to its rear portion and a pair of laterally spaced apart longitudinal steering skis at its forward end comprising:

carriage means, reactable between the rear portion of said snowmobile and a surface supporting said snowmobile for lifting said rear portion of said snowmobile off said surface and movably supporting it a spaced distance above the support surface, including:

frame means swingable between a removed position, in which said carriage means can be moved to a remote location, and a snowmobile support position underlying said rear support portion, to move said rear support portion upwardly away from said support surface; and rolling means supporting said frame means for movement in a swinging path of travel to said support position and for rolling movement, in said support position, on said surface to be traversed;

said frame means including a base frame member a front member extending upwardly and rearwardly from said base frame member and a rear member extending upwardly and forwardly from said base frame member and rigidly connected to said front member, the upper end of said front member providing a pivotal support member for separably engaging said rear support portion of said snowmobile, said rolling means including front and rear roller means engageable with said surface both forwardly and rearwardly of the center of gravity of said dolly apparatus and both forwardly and rearwardly of said pivotal support member when said rear snowmobile portion is supported thereon said pivtoal support member lying in a substantially vertical plane passing substantially midway between said front and rear roller means.

2. The dolly apparatus set forth in claim 1 wherein the center of gravity of said dolly apparatus moves rearwardly, as said frame means swings to said support position, from a position forward of the front roller to a position between the front and rear roller means.

3. The dolly apparatus set forth in claim 1 wherein said pivotal support member comprises open-ended slot means at the top of said converging frame members for receiving said rear portion of said snowmobile.

4. The apparatus set forth in claim 3 wherein said rear support portion of said snowmobile is generally U-shaped in plan and includes a cross bar rearwardly of said snowmobile spanning a pair of side bars fixed to said snowmobile, said cross bar being removably received in said slot means.

5. The dolly apparatus set forth in claim 1 including front dolly means for supporting the front of the snowmobile including:

a pair of laterally spaced apart carriage members defining longitudinal troughs for receiving the skis of the snowmobile, and rolling means engageable with the surface for supporting the carriage members for rolling movement on the surface in any direction.

6. The apparatus set forth in claim 5 wherein said front dolly means are of such length as to be disposed within the longitudinal extent of said snowmobile skis when they support the front of the smowmobile.

* * * * *